(12) United States Patent
Chen et al.

(10) Patent No.: US 11,322,067 B2
(45) Date of Patent: May 3, 2022

(54) DISPLAY DEVICE AND DISPLAY METHOD

(71) Applicant: Yungu (Gu'an) Technology Co., Ltd., Langfang (CN)

(72) Inventors: Xinquan Chen, Langfang (CN); Xiaobao Zhang, Langfang (CN); Zheng Wang, Langfang (CN); Wei Ding, Langfang (CN)

(73) Assignee: Yungu (Gu'au) Technology Co., Ltd., Hebei (CN)

( * ) Notice: Subject to any disclaimer, the term of this patent is extended or adjusted under 35 U.S.C. 154(b) by 0 days.

(21) Appl. No.: 17/365,883

(22) Filed: Jul. 1, 2021

(65) Prior Publication Data

US 2021/0327329 A1    Oct. 21, 2021

Related U.S. Application Data

(63) Continuation of application No. PCT/CN2020/071327, filed on Jan. 10, 2020.

(30) Foreign Application Priority Data

Jun. 27, 2019 (CN) .......................... 201910567740.6

(51) Int. Cl.
*G09G 3/20* (2006.01)
*G06V 40/13* (2022.01)

(52) U.S. Cl.
CPC ............ *G09G 3/20* (2013.01); *G06V 40/1318* (2022.01); *G09G 2320/0276* (2013.01); *G09G 2320/0626* (2013.01)

(58) Field of Classification Search
CPC .......................... G09G 3/20; G09G 2320/0626
See application file for complete search history.

(56) References Cited

U.S. PATENT DOCUMENTS

| 2009/0284181 A1* | 11/2009 | Kim | ....................... H05B 45/10 |
| | | | 315/307 |
| 2017/0140715 A1* | 5/2017 | Lien | ..................... G09G 3/2003 |
| 2019/0189040 A1 | 6/2019 | Shin | |

FOREIGN PATENT DOCUMENTS

| CN | 108257544 A | 7/2018 |
| CN | 108766347 A | 11/2018 |

(Continued)

OTHER PUBLICATIONS

PCT International Search Report for International Application No. PCT/CN2020/071327 dated Apr. 1, 2020.

(Continued)

*Primary Examiner* — Gerald Johnson

(57) ABSTRACT

A display device includes: a screen body, including a first display area and a second display area; and a display driving chip; wherein the display driving chip includes: a first preset grayscale generation module, configured to generate a first preset grayscale voltage; a second grayscale generation module, configured to calculate the grayscale required by each pixel unit in the second display area according to image data, and generate a grayscale voltage range including a plurality of grayscale voltages; a grayscale driving module and configured to select the grayscale voltage corresponding to the grayscale required by each pixel unit in the second display area from the grayscale voltage range; and, a first control module, electrically connected to the grayscale driving module, configured to control the grayscale driving module to allocate the first preset grayscale voltage to all pixel units in the first display area.

16 Claims, 6 Drawing Sheets

(56) References Cited

FOREIGN PATENT DOCUMENTS

| | | | |
|---|---|---|---|
| CN | 108766975 A | 11/2018 |
| CN | 108830190 A | 11/2018 |
| CN | 109256090 A | 1/2019 |
| CN | 109545132 A | 3/2019 |
| CN | 109712593 A | 5/2019 |
| CN | 109801605 A | 5/2019 |
| CN | 110276326 A | 9/2019 |
| CN | 110310597 A | 10/2019 |
| TW | 201432645 A | 8/2014 |
| TW | M569880 U | 11/2018 |

OTHER PUBLICATIONS

PCT Written opinion for International Application No. PCT/CN2020/071327 dated Apr. 1, 2020.
Chinese First Office Action for CN Application No. 201910567740.6 dated Jan. 4, 2021.
Chinese Second Office Action for CN Application No. 201910567740.6 dated Feb. 26, 2021.
Chinese Third Office Action for CN Application No. 201910567740.6 dated Apr. 26, 2021.
Taiwan First Office Action for Application No. 109101465 dated Aug. 4, 2020.
Taiwan Second Office Action for Application No. 109101465 dated Dec. 16, 2020.
Taiwan Third Office Action for Application No. 109101465 dated Apr. 16, 2021.

\* cited by examiner

DISPLAY DEVICE AND DISPLAY METHOD

CROSS-REFERENCE TO RELATED DISCLOSURES

This application is a continuation of International Application No. PCT/CN2020/071327 filed on Jan. 10, 2020, which claims priority to Chinese patent application No. 201910567740.6, filed on Jun. 27, 2019. Both applications are incorporated herein by reference in their entireties.

TECHNICAL FIELD

The present disclosure relates to the technical field of display, in particular to a display device and a display method.

BACKGROUND

With the continuous development of display technology, optical screen fingerprint recognition technology has attracted much attention. For a present display device, during a wake-up period of optical fingerprint, a fingerprint recognition area of a screen needs to be turned on at maximum brightness to ensure accuracy of fingerprint recognition. However, this will cause flickers or sudden brightness changes in a non-fingerprint recognition area, thereby affecting the user experience.

SUMMARY

In view of this, embodiments of the present disclosure provide a display device and a display method to solve a problem of flickers or sudden brightness changes in the non-fingerprint recognition in the prior art.

An aspect of the present disclosure provides a display device, the display device includes: a screen body, including a first display area and a second display area; and a display driving chip, electrically connected to the screen body, configured to drive the screen body to display and emit light. The display driving chip includes: a first preset grayscale generation module, configured to generate a first preset grayscale voltage; a second grayscale generation module, configured to calculate a grayscale required by each pixel unit in the second display area according to image data, and generate a grayscale voltage range including a plurality of grayscale voltages; a grayscale driving module, electrically connected to the first preset grayscale generation module and the second grayscale generation module and configured to select a grayscale voltage corresponding to the grayscale required by each pixel unit in the second display area from the grayscale voltage range; and a first control module, electrically connected to the grayscale driving module, configured to control the grayscale driving module to allocate the first preset grayscale voltage to all pixel units in the first display area.

Another aspect of the present disclosure provides a display method of a screen body, the screen body includes a first display area and a second display area, and the display method includes: generating a first preset grayscale voltage; calculating a grayscale required by each pixel unit in the second display area according to image data, and generating a grayscale voltage range including a plurality of grayscale voltages; selecting a grayscale voltage corresponding to the grayscale required by each pixel unit in the second display area from the grayscale voltage range; and allocating the first preset grayscale voltage to all pixel units in the first display area.

Another aspect of the present disclosure provides an electronic device including a processor and a memory, the memory stores a program, the processor executes the above display method of the screen body in case of the program is executed by the processor.

The present disclosure provides a display device, a first preset grayscale voltage is generated by the first preset grayscale generation module, and the grayscale driving module is controlled by the first control module to allocate the first preset grayscale voltage to all pixel units in the first display area, so that all pixel units in the first display area display a first preset grayscale. Thus, the grayscale of all pixels in the first display area can be controlled independently, an association between the first display area and the second display area can be reduced, and flickers or sudden brightness changes of the second display area can be avoided.

DETAILED DESCRIPTION

Display devices have a technical problem that a non-fingerprint recognition area is prone to flickers or sudden brightness changes during a wake-up period of optical fingerprint. Through research, the inventor has found that the reason for this problem is that, for a present display device, all areas of the screen are turned on at maximum brightness to ensure an accuracy of the fingerprint recognition area, then the brightness of the non-fingerprint recognition area is turned down, the brightness of the fingerprint recognition area is not individually controlled, and the non-fingerprint recognition area flickers or suddenly changes in brightness during this process. In order to solve the above problem, the inventor has found, through research, that flickers or sudden brightness changes can be effectively avoid by independently controlling the grayscale of all pixel units in the fingerprint recognition area, and reducing an association of controlling the grayscale of all pixel units between the fingerprint recognition area and the non-fingerprint recognition area.

Hereinafter, the technical solutions in the embodiments of the present disclosure will be described clearly and completely in conjunction with figures in drawing of the present disclosure. Obviously, the described embodiments are only a part of embodiments of the present disclosure, rather than all embodiments. Based on the embodiments in the present disclosure, all other embodiments obtained by those of ordinary skill in the art without creative work fall within the protection scope of the present disclosure.

Figure 1:
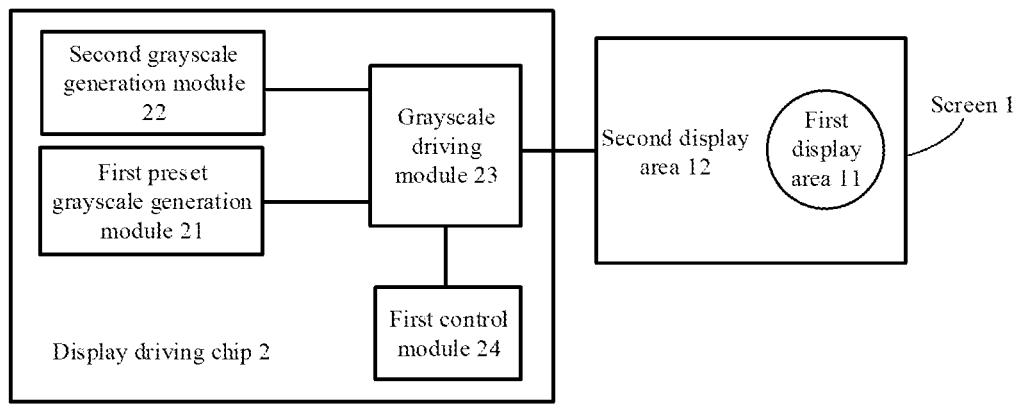
FIG. 1 is a schematic structural diagram of a display device provided by an embodiment of the present disclosure.

FIG. 1 is a schematic structural diagram of a display device provided by an embodiment of the present disclosure. As shown in FIG. 1, the display device includes: a screen body 1, including a first display area 11 and a second display area 12; and a display driving chip 2, electrically connected to the screen body 1 and configured to drive the screen body 1 to display and emit light. The display driving chip 2 includes: a first preset grayscale generation module 21, configured to generate a first preset grayscale voltage; a second grayscale generation module 22, configured to calculate the grayscale required by each pixel unit in the second display area 12 according to image data, and generate a grayscale voltage range including a plurality of grayscale voltages; a grayscale driving module 23, electrically connected to the first preset grayscale generation module 21 and the second grayscale generation module 22 and configured to select the grayscale voltage corresponding to the grayscale required by each pixel unit in the second display area 12 from the grayscale voltage range; and a first control module 24, electrically connected to the grayscale driving module 23 and configured to control the grayscale driving module 23 to allocate the first preset grayscale voltage to all pixel units in the first display area.

The first preset grayscale voltage is generated by the first preset grayscale generation module 21, and the grayscale driving module 23 is controlled by the first control module 24 to allocate the first preset grayscale voltage to all pixel units in the first display area 11, so that all pixel units in the first display area 11 display a first preset grayscale. Thus, the grayscale of all pixels in the first display area 11 can be controlled independently, the association between the first display area 11 and the second display area 12 can be reduced, and flickers or sudden brightness changes of the second display area 12 can be avoided.

The screen body 1 may be a display screen, for example, an organic light emitting diode (OLED) screen, or the like. As long as the screen can provide displaying images, the disclosure does not limit the specific display form of the screen. The first preset grayscale generation module 21 may be an independent circuit structure within the display chip, or may be integrated into other modules. Embodiments of the present disclosure do not limit the specific implementation form of the first preset grayscale generation module 21.

The smaller the voltage value of the grayscale voltage is, the higher the grayscale is, and the greater the brightness value is. A voltage value of the first preset grayscale voltage may be smaller than a voltage value of anyone of the grayscale voltages in the grayscale voltage range, or the voltage value of the first preset grayscale voltage may be larger than the voltage value of anyone of the grayscale voltages in the grayscale voltage range.

The first display area 11 may be a fingerprint recognition area, or may be a display area corresponding to an under-screen camera. In a case where the first display area 11 is a fingerprint recognition area, the voltage value of the first preset grayscale voltage is smaller than the voltage value of anyone of the grayscale voltages in the grayscale voltage range, so that the grayscale of the first display area 11 is higher than that of the second display area 12, so as to ensure the accuracy of fingerprint region recognition. In another case where the first display area 11 is a display area corresponding to an under-screen camera, the voltage value of the first preset grayscale voltage is greater than the voltage value of anyone of the grayscale voltages in the grayscale voltage range, so that the grayscale of the first display area 11 is lower than that of the second display area 12, so as to ensure that the brightness of the display area corresponding to the under-screen camera is low enough to avoid high brightness affecting shooting effect. The above are only two specific disclosure scenarios of embodiments of the present disclosure, but are not limited to the above disclosure scenarios. Embodiments of the present disclosure do not specifically limit the first preset grayscale voltage.

The first control module 24 may be an independent circuit structure within the display chip or a micro integrated circuit module within the display chip. As long as the first control module 24 can control the grayscale driving module 23 to allocate the first preset grayscale voltage to all pixel units in the first display area 11, embodiments of the present disclosure do not limit the specific implementation form of the first control module 24.

Figure 2:
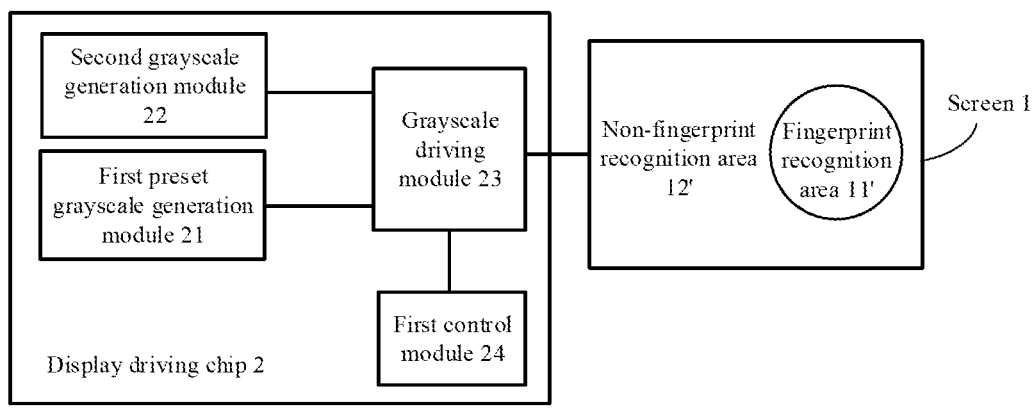
FIG. 2 is a schematic structural diagram of a display device provided by an embodiment of the present disclosure.

FIG. 2 is a schematic structural diagram of a display device provided by an embodiment of the present disclosure. As shown in FIG. 2, the first display area 11 includes a fingerprint recognition area 11', and the second display area 12 includes a non-fingerprint recognition area 12'. The voltage value of the first preset grayscale voltage is smaller than the voltage value of anyone of the grayscale voltages in the grayscale voltage range.

The first control module 24 controls the grayscale driving module 23 to allocate the first preset grayscale voltage to all pixel units in the fingerprint recognition area 11', and the voltage value of the first preset grayscale voltage is lower than the voltage value of anyone of the grayscale voltages in the grayscale voltage range, so that the grayscale of all pixel units in the fingerprint recognition area 11' is higher than that of the non-fingerprint recognition area 12', therefore, the brightness of the fingerprint recognition area 11' is high enough to improve the accuracy of fingerprint recognition. In addition, since the first control module 24 separately allocates the first preset grayscale voltage to all pixel units in the fingerprint recognition area 11', the association between the fingerprint recognition area 11' and the non-fingerprint recognition area 12' is reduced, and the flickers or sudden brightness changes of the non-fingerprint recognition area 12' is avoided.

In a case where the screen body 1 is a 4-bit image display screen body also called a 4-bit screen body, the grayscale voltage range includes grayscale voltages from level 0 to level 15, and the first preset grayscale voltage may be a grayscale voltage in level 16. In a case where the screen body 1 is an 8-bit image display screen body also called an 8-bit screen body, the grayscale voltage range includes grayscale voltages from level 0 to level 255, and the first preset grayscale voltage may be a grayscale voltage in level 256. In a case where the screen body 1 is a 10-bit image display screen body also called a 10-bit screen body, the grayscale voltage range includes grayscale voltages from level 0 to level 1023, the first preset grayscale voltage may be a grayscale voltage in level 1024. As long as the voltage value of the first preset grayscale voltage is smaller than anyone of the grayscale voltages in the grayscale voltage range, embodiments of the disclosure do not limit the specific orders of the first preset grayscale voltage.

Optionally, the grayscale voltage range includes grayscale voltages from level 0 to level 255, and the first preset grayscale voltage includes the grayscale voltage in level 256.

Since the 8-bit screen body is the most common screen body with clear display effect, correspondingly, grayscale voltages from level 0 to level 255 are also common. The second grayscale generation module 22 calculates, according to the image data, the grayscale required by each pixel unit in the non-fingerprint recognition area 12', generates grayscale voltages from level 0 to level 255, and selects, through the grayscale driving module 23, the grayscale voltage corresponding to the grayscale required by each pixel unit in the non-fingerprint recognition area 12' from grayscale voltages from level 0 to level 255. The first preset grayscale generation module 21 generates the independent grayscale voltage in level 256, and controls the grayscale driving module 23 to allocate the grayscale voltage in level 256 to all pixel units in the fingerprint recognition area 11' through the first control module 24. This not only makes the grayscales of all pixel units in the fingerprint recognition area 11' higher than those of the non-fingerprint recognition area 12' to ensure that the brightness of the fingerprint recognition area 11' is high enough to improve the accuracy of fingerprint recognition, but also reduces the association between the fingerprint recognition area 11' and the non-fingerprint recognition area 12' and avoids flickers or sudden brightness changes in the non-fingerprint recognition area 12'.

Figure 3:
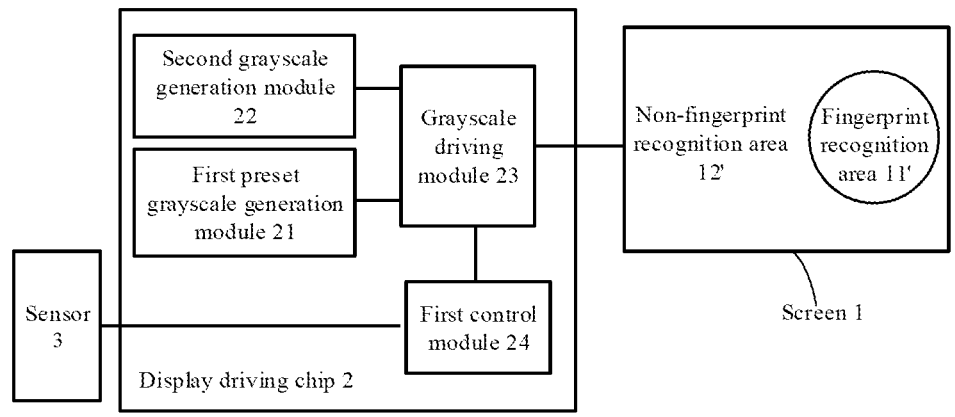
FIG. 3 is a schematic structural diagram of a display device provided by an embodiment of the present disclosure.

FIG. 3 is a schematic structural diagram of a display device provided by an embodiment of the present disclosure. As shown in FIG. 3, the display device further includes: a sensor 3, electrically connected to the first control module 24, configured to send a recognition start signal to the first control module 24 in response to sensing that the screen body 1 is in a state that a fingerprint is to be recognized. The first control module 24 is further configured to control the grayscale driving module 23 to allocate the grayscale voltage in level 256 to all pixel units in the fingerprint recognition area in response to receiving the recognition start signal.

In a case where the sensor 3 senses that the screen body 1 is in a state of pre-fingerprint recognition, the sensor 3 sends a recognition start signal to the first control module 24, the first control module 24 receives the recognition start signal, and the first control module 24 controls the grayscale driving module 23 to allocate the grayscale voltage in level 256 to all pixel units in the fingerprint recognition area 11'. Therefore, the grayscale of fingerprint recognition area 11' may be controlled independently.

The sensor 3 may be a piezoelectric sensor 3, a photosensitive sensor 3, or an infrared sensor 3. Embodiments of the present disclosure do not limit the specific form of the sensor 3.

The display device may further include: an AP (Application Processor) module disposed between the sensor 3 and the first control module 24. In a case where the sensor 3 senses that the screen body 1 is in the state of waiting for fingerprint recognition, the sensor 3 sends the recognition start signal to the AP module. The AP module transmits the recognition start signal to the first control module 24. The first control module 24 receives the recognition start signal, and the first control module 24 controls the grayscale driving module 23 to allocate the 256th grayscale voltage to all pixel units in the fingerprint recognition area 11'. Therefore, the grayscale of fingerprint recognition area 11' may be controlled independently.

The AP module not only can transmit the recognition start signal to the first control module 24, but also can transmit other information. As long as the AP module can transmit the recognition start signal to the first control module 24, other functions of the AP module are not specifically limited in embodiments of the present disclosure.

Figure 4:
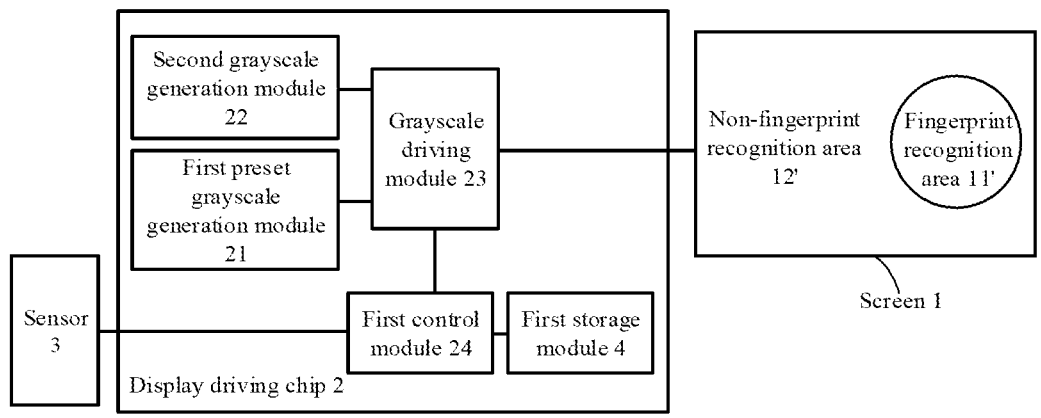
FIG. 4 is a schematic structural diagram of a display device provided by an embodiment of the present disclosure.

FIG. 4 is a schematic structural diagram of a display device provided by an embodiment of the present disclosure. As shown in FIG. 4, the display driving chip 2 further includes: a first register module 4, electrically connected to the first control module 24, configured to provide register information of the fingerprint recognition area to all pixel units in the fingerprint recognition area when the first control module 24 receives the recognition start signal. The register information refers to information to be registered of the fingerprint recognition area 11' such as image shape, image position, image color, and the like of the fingerprint recognition area 11' in a fingerprint recognition mode.

In a case where the first control module 24 receives the recognition start information, the first register module 4 sends the register information of the fingerprint recognition area 11' to all the pixel units in the fingerprint recognition area 11', so that the optical image of the fingerprint recognition area 11' is displayed on the screen body 1.

Optionally, the first control module 24 is integrated into the first control module 24. The first register module 4 is integrated into the first control module 24. In a case where the first control module 24 receives the recognition start information, the first register module 4 provides the register information of the fingerprint recognition area 11' to all pixel units in the fingerprint recognition area 11', so that the optical image of the fingerprint recognition area 11' is displayed on the screen body 1. The first control unit 24 controls the grayscale driving module 23 to allocate the grayscale voltage in level 256 to all pixel units in the fingerprint recognition area 11', so as to ensure the accuracy of fingerprint recognition, and ensure the non-fingerprint recognition area 12' does not flicker or suddenly change in brightness.

Figure 5:
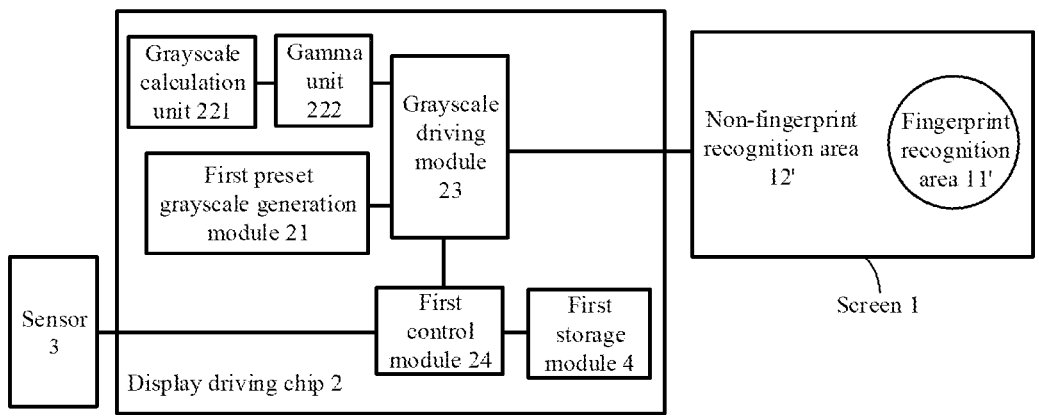
FIG. 5 is a schematic structural diagram of a display device provided by an embodiment of the present disclosure.

FIG. 5 is a schematic structural diagram of a display device provided by an embodiment of the present disclosure. As shown in FIG. 5, the second grayscale generation module 22 includes: a grayscale calculation unit 221, configured to calculate the grayscale required by each pixel unit in the second display area 12 according to the image data; and a gamma unit 222, electrically connected to the grayscale calculation unit 221, configured to generate the grayscale voltage range. Pixel units in the non-fingerprint recognition region 12' require different grayscales to realize the display of different brightness of an image. The grayscale calculation unit 221 may calculate the required grayscale of each pixel in the non-fingerprint recognition area 12' according to the received image data. According to the total number of the grayscales required and using the corresponding relationship between grayscale and grayscale voltage, the gamma unit 222 calculates the grayscale voltage corresponding to each level of grayscale between the highest voltage value and the lowest voltage value by a differential operation.

Both the grayscale calculation unit 221 and the gamma unit 222 may be independent circuit structures within the display chip, or both may be micro integrated circuit units within the display chip. Embodiments of the present disclosure do not specifically limit the circuit structures of the grayscale computing unit 221 and the gamma unit 222.

The display device may further include: an AP (Application Processor) module disposed between the sensor 3 and the first grayscale calculation unit 221. The AP module is electrically connected to the first control module 24 and the first grayscale calculation unit 221. The AP module is further configured to transmit the recognition start signal to the first control module 24, and transmit the image data to the first grayscale calculation unit 221.

In a case where the sensor 3 senses that the screen body 1 is in a state of pre-fingerprint recognition, the sensor 3 sends a recognition start signal to the AP module. The AP module transmits the recognition start signal to the first control module 24, and the AP module transmits the image data to the grayscale calculation unit 221. The first control module 24 controls the grayscale driving module 23 to allocate the grayscale voltage in level 256 to all pixel units in the fingerprint recognition area 11'. The grayscale calculation unit 221 calculates the grayscale required for each pixel unit in the second display area 12 according to the image data.

Figure 6:
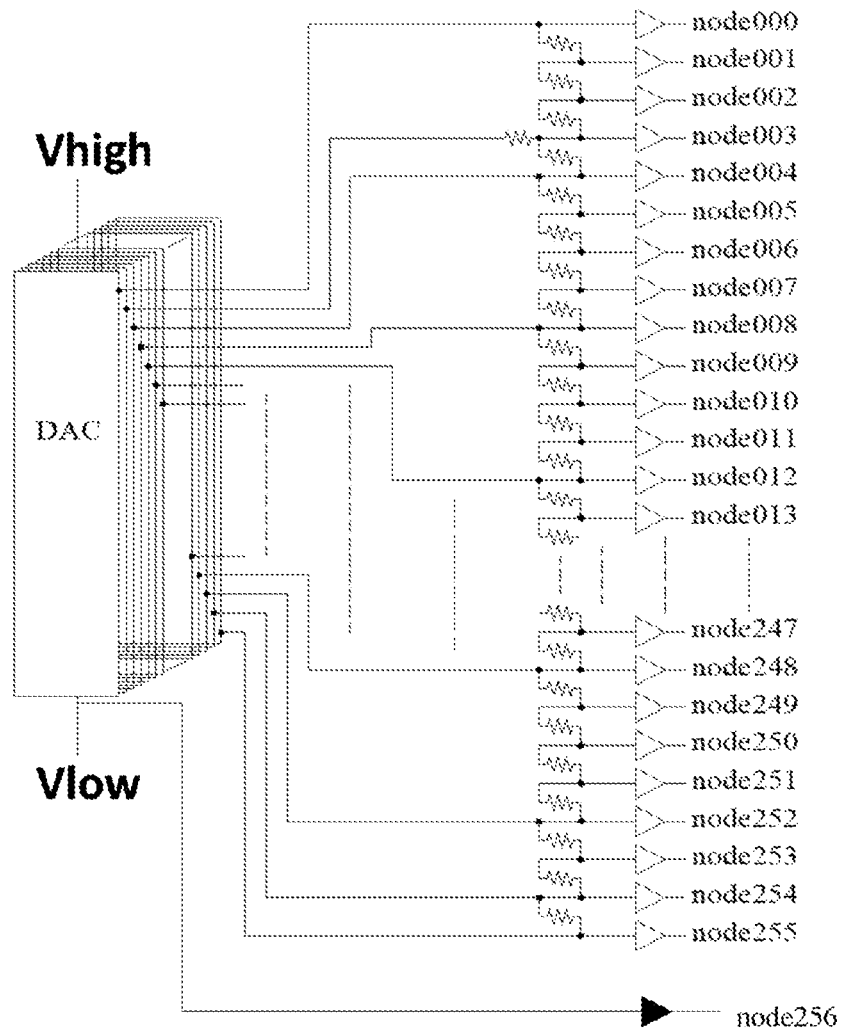
FIG. 6 is a schematic diagram showing a principle of integrating the first preset grayscale generation module into a gamma unit of a display device provided by an embodiment of the present disclosure.

FIG. 6 is a schematic diagram showing the principle of integrating the first preset grayscale generation module into a gamma unit of the display device provided by an embodiment of the present disclosure. The first preset grayscale generation module 21 is integrated into the gamma unit 222, and a corresponding integrating method is as shown in FIG. 6. Based on the architecture of gamma unit 222, a control bit such as node 256 shown in FIG. 6 is added, to generate the 256th grayscale voltage separately. By adding a control bit to the original gamma unit 222, the grayscale voltage in level 256 can be generated independently, and a wiring space can be saved.

The main voltage source of the grayscale voltage in level 256 may be the voltage at the lowest voltage end of the gamma unit 222, or other independent adjustable voltage at the same level as the lowest voltage end of the gamma unit 222. As long as the voltage value of the grayscale voltage in level 256 is lower than the voltage value of anyone of grayscale voltages from level 0 to level 255, embodiments of the present disclosure do not specifically limit the main voltage source of the 256th grayscale voltage.

Figure 7:
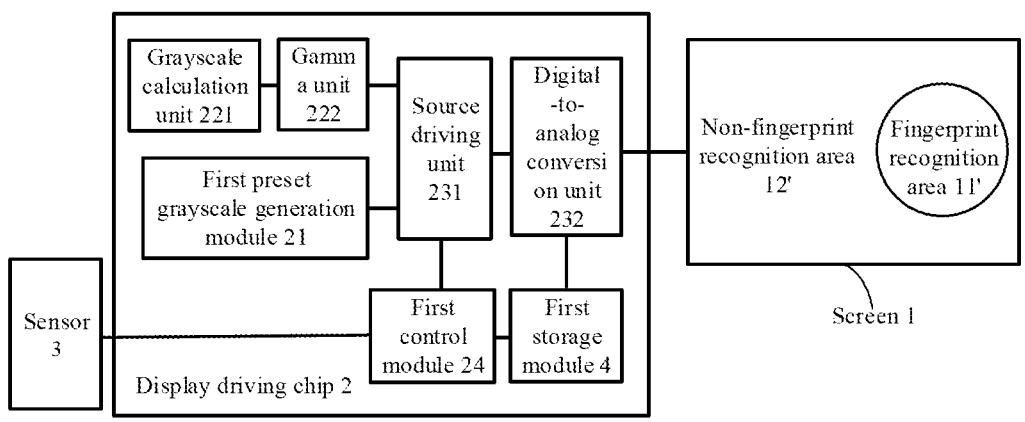
FIG. 7 is a schematic structural diagram of a display device provided by an embodiment of the present disclosure.

FIG. 7 is a schematic structural diagram of a display device provided by an embodiment of the present disclosure. As shown in FIG. 7, the greyscale driving module 23 includes: a source driving unit 231, configured to calculate a digital instruction and send the digital instruction to a digital-to-analog conversion unit 232, wherein the digital instruction is configured to perform selecting the grayscale voltage corresponding to the grayscale required by each pixel unit in the second display area 12 from the grayscale voltage range; and the digital-to-analog conversion unit 231, configured to convert the digital instruction. Therefore, it is realized to select the grayscale voltage corresponding to the grayscale required by each pixel unit in the second display area 12 from the grayscale voltage range.

The grayscale driving module 23 needs to select the grayscale voltage corresponding to the grayscale required by each pixel unit in the non-fingerprint recognition region 12' from the grayscale voltage range generated by the second grayscale generation module 22. The source driving unit 231 calculates the digital instruction to perform the selection operation and sends the digital instruction to the digital-to-analog conversion unit 232. Through converting the digital instruction, the digital-to-analog conversion unit 232 realizing an operation of selecting the grayscale voltage corresponding to the grayscale of each pixel unit in the non-fingerprint recognition area 12' from the grayscale voltage range.

Figure 8:
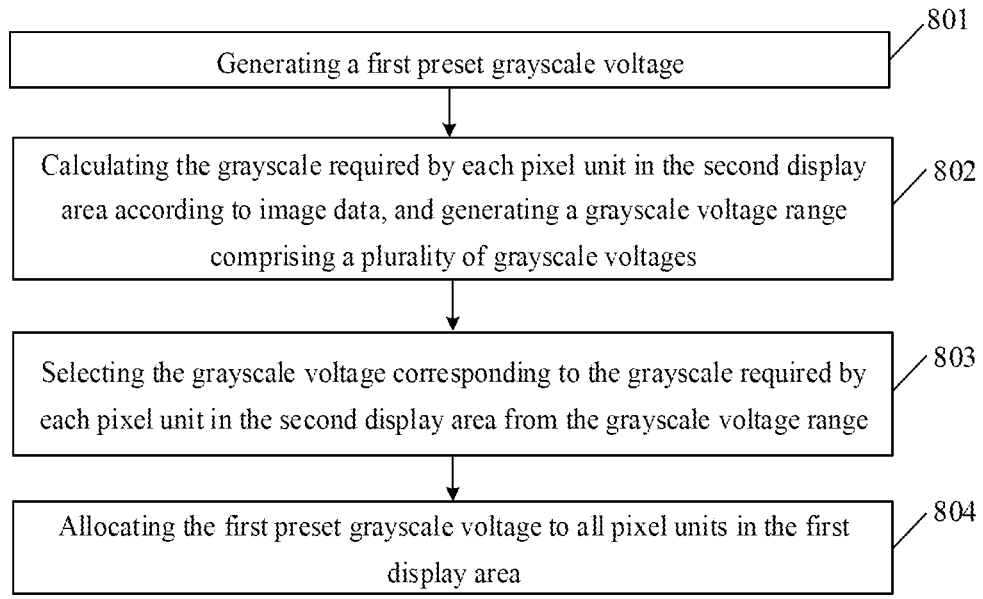
FIG. 8 is a schematic flowchart of a display method of a screen body provided by an embodiment of the disclosure.

FIG. 8 is a schematic flowchart of a display method of a screen body provided by an embodiment of the present disclosure. The screen body includes a first display area and a second display area. Referring to FIG. 8, the display method includes the following steps:

Step 801: generating a first preset grayscale voltage;

Step 802: calculating a grayscale required by each pixel unit in the second display area according to image data, and generating a grayscale voltage range including a plurality of grayscale voltages;

Step 803: selecting a grayscale voltage corresponding to the grayscale required by each pixel unit in the second display area from the grayscale voltage range; and, Step 804: allocating the first preset grayscale voltage to all pixel units in the first display area.

The first preset grayscale voltage is generated, and the first preset grayscale voltage is allocated to all pixel units in the first display area, so that all pixel units in the first display area display the first preset grayscale, thereby reducing the association between the first display area and the second display area and avoiding flickers or sudden brightness changes in the second display area.

The smaller the voltage value of the grayscale voltage is, the higher the grayscale is, and the greater the brightness value is. A voltage value of the first preset grayscale voltage may be smaller than the voltage value of anyone of the grayscale voltages in the grayscale voltage range, or the voltage value of the first preset grayscale voltage may be greater than the voltage value of anyone of the grayscale voltages in the grayscale voltage range. The second display area may be a fingerprint recognition area, or may be a display area corresponding to an under-screen camera. In a case where the second display area is a fingerprint recognition area, the voltage value of the first preset grayscale voltage is smaller than the voltage value of anyone of the grayscale voltages in the grayscale voltage range, so that the grayscale of the second display area is higher than that of the first display area, so as to ensure the accuracy of fingerprint region recognition. In another case where the second display area is a display area corresponding to an under-screen camera, the voltage value of the first preset grayscale voltage is greater than the voltage value of anyone of the grayscale voltages in the grayscale voltage range, so that the grayscale of the second display area is lower than that of the first display area, so as to ensure that the brightness of the display area corresponding to the under-screen camera is low enough to avoid high brightness affecting shooting effect. The above are only two specific disclosure scenarios of embodiments of the present disclosure, but are not limited to the above disclosure scenarios. Embodiments of the present disclosure do not specifically limit the first preset grayscale voltage.

Although the display method is described in the sequence of steps shown in FIG. 8, it should not be understood that the display method can only be implemented in the sequence of steps shown in FIG. 8. The execution sequence of the method can also be step 801, step 804, step 802 and step 803; or be step 801, step 802, step 804 and step 803. As long as step 801 is before step 804, and step 802 is before step 803, the embodiment of the present disclosure does not specifically limit the sequence of step 801, step 802, step 803 and step 804.

Optionally, the first display area includes a fingerprint recognition area, and the second display area includes a non-fingerprint recognition area. The voltage value of the first preset grayscale voltage is smaller than the voltage value of anyone of the grayscale voltages in the grayscale voltage range.

The first preset grayscale voltage is generated, and the first preset grayscale voltage is allocated to all pixel units in the fingerprint recognition area. Since the voltage value of the first preset grayscale voltage is lower than the voltage value of anyone of the grayscale voltages in the grayscale voltage range, so that the grayscale of all pixel units in the fingerprint recognition area is higher than that of the non-fingerprint recognition area, therefore, the brightness of the fingerprint recognition area is high enough to improve the accuracy of fingerprint recognition. In addition, since the first control module separately allocates the first preset grayscale voltage to all pixel units in the fingerprint recognition area, the association between the fingerprint recognition area and the non-fingerprint recognition area is reduced, and the flickers or sudden brightness changes of the non-fingerprint recognition area is avoided.

Optionally, the grayscale voltage range includes grayscale voltages from level 0 to level 255, and the first preset grayscale voltage includes a grayscale voltage in level 256.

Since the 8-bit screen body is the most common screen body with clear display effect, correspondingly, grayscale voltages from level 0 to level 255 are also common. According to the image data, the grayscale required by each pixel unit in the non-fingerprint recognition area is calculated, grayscale voltages from level 0 to level 255 are generated, and the grayscale voltage corresponding to the grayscale required by each pixel unit in the non-fingerprint recognition area is selected from the grayscale voltages from level 0 to level 255. An independent grayscale voltage in level 256 is generated, and the grayscale voltage in level 256 is allocated to all pixel units in the fingerprint recognition area. This not only makes the grayscale of all pixel units in the fingerprint recognition area higher than that of the non-fingerprint recognition area to ensure that the brightness of the fingerprint recognition area is high enough to improve the accuracy of fingerprint recognition, but also reduces the association between the fingerprint recognition area and the non-fingerprint recognition area and avoids flickers or sudden brightness changes in the non-fingerprint recognition area.

Figure 9:
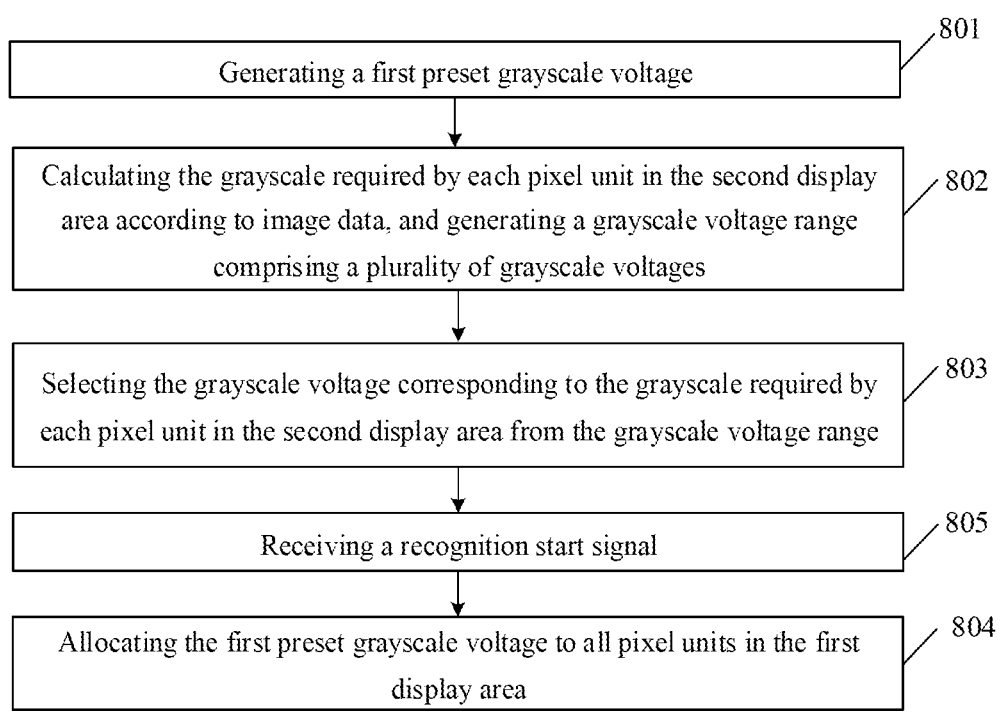
FIG. 9 is a schematic flowchart of a display method of a screen body provided by an embodiment of the disclosure.

FIG. 9 is a schematic flowchart of a screen body display method provided by an embodiment of the disclosure. As shown in FIG. 9, before step 804: allocating the first preset grayscale voltage to all pixel units in the first display area, the display method further includes step 805: receiving a recognition start signal. The recognition start signal is configured to indicate that the display device needs to start the fingerprint recognition area for fingerprint recognition.

The recognition start signal is configured to indicate that the display device needs to start the fingerprint recognition area for fingerprint recognition. After receiving the recognition start signal, the grayscale voltage in level 256 is allocated to all pixel units in the fingerprint recognition area, so that the grayscale of the fingerprint recognition area can be controlled independently.

Figure 10:
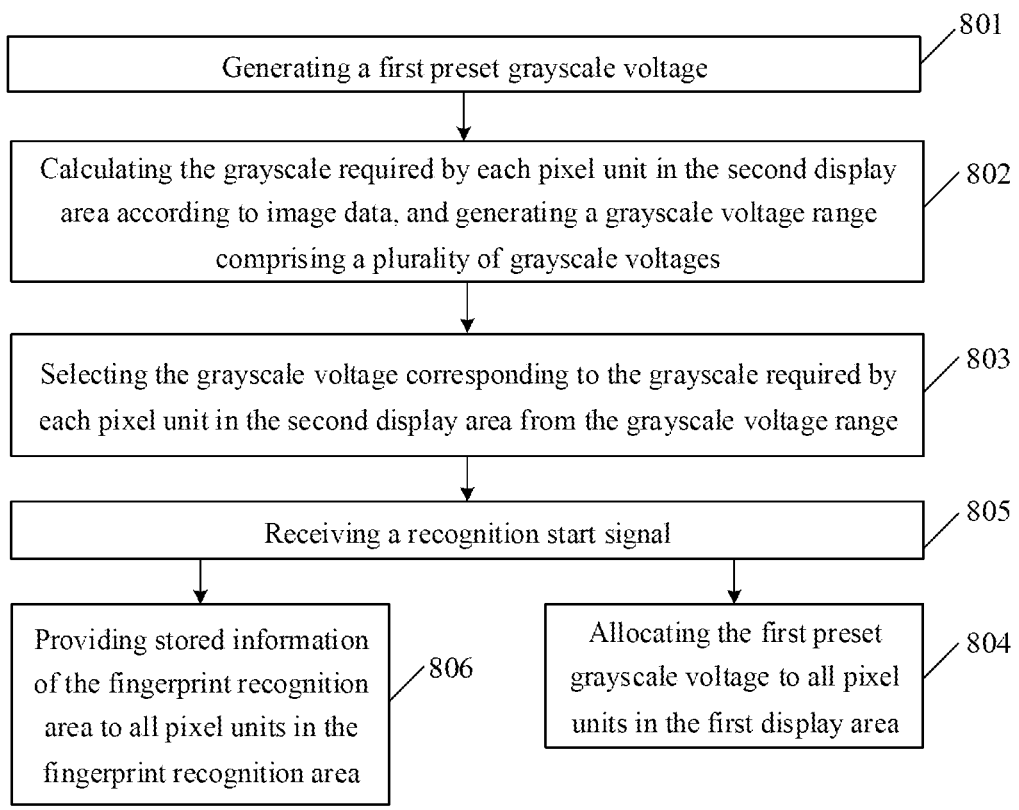
FIG. 10 is a schematic flowchart of a display method of a screen body according to an embodiment of the disclosure.

FIG. 10 is a schematic flowchart of a screen body display method according to an embodiment of the disclosure. As shown in FIG. 10, after step 805 of receiving the recognition start signal, the display method further includes step 806: providing register information of the fingerprint recognition area to all pixel units in the fingerprint recognition area.

The register information refers to information to be registered of the fingerprint recognition area such as image shape, image position, image color, and the like of the fingerprint recognition area in the fingerprint recognition mode. After receiving the recognition start information, the register information of the fingerprint recognition area is provided to all the pixel units in the fingerprint recognition area, so that the optical image of the fingerprint recognition area is displayed on the screen body.

Although the method is described in the sequence of steps shown in FIG. 10, it should not be understood that the method can only be implemented in the sequence of steps shown in FIG. 10. Step 806 may be after step 804, and step 806 may be before step 804. As long as step 806 is after step 805. The implementation sequence of steps 804 and 806 is not specified in the embodiment of the disclosure.

Figure 11:
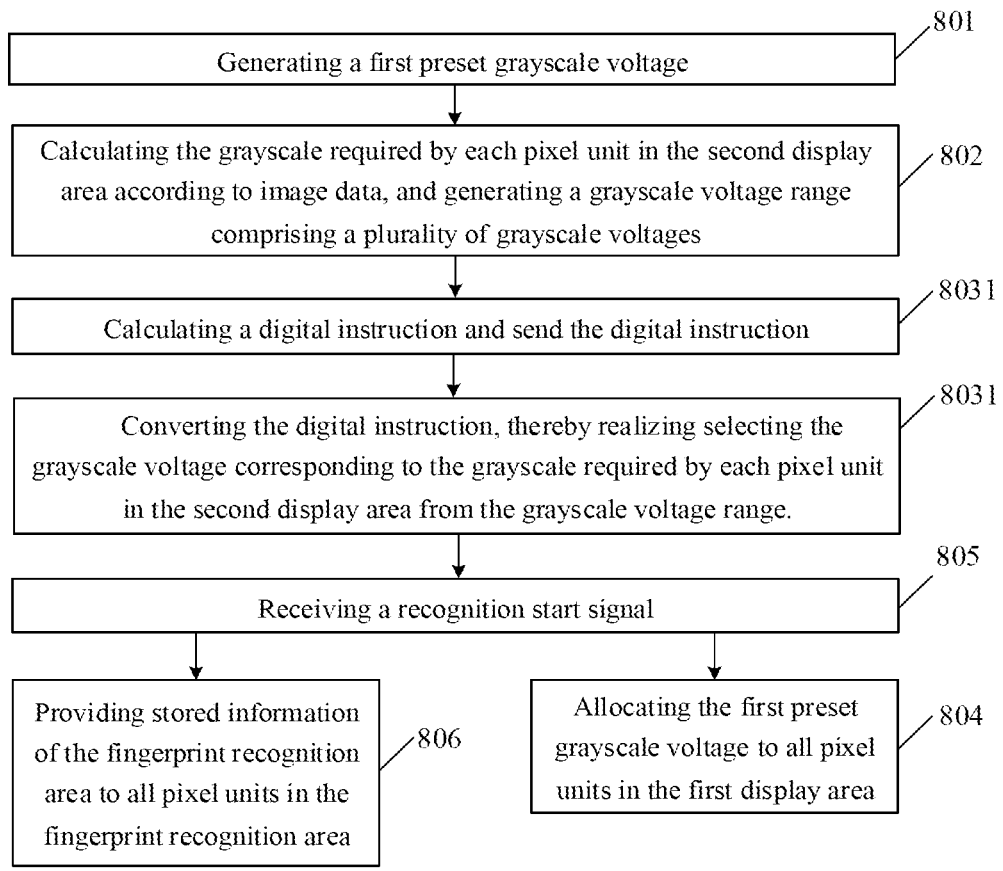
FIG. 11 is a schematic flowchart of a display method of a screen body provided by an embodiment of the present disclosure.

FIG. 11 is a schematic flowchart of a screen body display method provided by an embodiment of the present disclosure. As shown in FIG. 11, step 803 of selecting the grayscale voltage corresponding to the grayscale required by each pixel unit in the second display area from the grayscale voltage range includes:

Step 8031: calculating a digital instruction and send the digital instruction to a digital-to-analog conversion unit, and the digital instruction being configured to perform selecting the grayscale voltage corresponding to the grayscale required by each pixel unit in the second display area from the grayscale voltage range;

Step 8032: converting the digital instruction to perform realizing selecting the grayscale voltage corresponding to the grayscale required by each pixel unit in the second display area from the grayscale voltage range.

Only digital signals are transmitted between the modules. Firstly, digital instructions are calculated, and then the grayscale voltage corresponding to the grayscale of each pixel unit in the second display area is selected from the grayscale voltage range through digital-to analog-conversion.

The present disclosure also provides an electronic device which includes a processor and a memory. The memory stores a program. When the program is executed by the processor, the processor can execute the screen body display method described above.

The foregoing descriptions are only better embodiments of the present disclosure and is not intended to limit the present disclosure. Any modification, equivalent substitution, etc. made within the spirit and principle of the present disclosure shall be included in the protection scope of the present disclosure.

What is claimed is:

1. A display device, comprising:
a screen body, comprising a first display area and a second display area; and
a display driving chip, electrically connected to the screen body and configured to drive the screen body to display and emit light;
wherein the display driving chip comprises:
a first preset grayscale generation module, configured to generate a first preset grayscale voltage;
a second grayscale generation module, configured to calculate a grayscale required by each pixel unit in the second display area according to image data and generate a grayscale voltage range comprising a plurality of grayscale voltages;
a grayscale driving module, electrically connected to the first preset grayscale generation module and the second grayscale generation module and configured to select a grayscale voltage corresponding to the grayscale required by each pixel unit in the second display area from the grayscale voltage range; and a first control module, electrically connected to the grayscale driving module, and configured to control the grayscale driving module to allocate the first preset grayscale voltage to all pixel units in the first display area.

2. The display device according to claim 1, wherein the first display area comprises a fingerprint recognition area, the second display area comprises a non-fingerprint recognition area, and a voltage value of the first preset grayscale voltage is smaller than a voltage value of anyone of the plurality of grayscale voltages in the grayscale voltage range.

3. The display device according to claim 2, wherein the grayscale voltage range comprises grayscale voltages from level 0 to level 255, and the first preset grayscale voltage comprises a grayscale voltage in level 256.

4. The display device according to claim 3, further comprising:

a sensor, electrically connected to the first control module and configured to send a recognition start signal to the first control module in response to sensing that the screen body is in a state that a fingerprint is to be recognized;

wherein the first control module is further configured to control the grayscale driving module to allocate the 256th grayscale voltage to all pixel units in the fingerprint recognition area in response to receiving the recognition start signal.

5. The display device according to claim 4, wherein the display driving chip further comprises:

a first register module, electrically connected to the first control module and configured to provide a register information of the fingerprint recognition area to all pixel units in the fingerprint recognition area in response to receiving the recognition start signal by the first control module.

6. The display device according to claim 5, wherein the first register module is integrated in the first control module.

7. The display device according to claim 2, wherein the second grayscale generation module comprises:

a grayscale calculation unit, configured to calculate the grayscale required by each pixel unit in the second display area according to the image data; and a gamma unit, electrically connected to the grayscale calculation unit and configured to generate the grayscale voltage range.

8. The display device according to claim 7, wherein the first preset grayscale generation module is integrated in the gamma unit.

9. The display device according to claim 2, wherein the grayscale driving module comprises: a source driving unit and a digital-to-analog conversion unit;

wherein the source driving unit is configured to calculate a digital instruction and send the digital instruction to a digital-to-analog conversion unit, and the digital instruction is configured to select the grayscale voltage corresponding to the grayscale required by each pixel unit in the second display area from the grayscale voltage range; and the digital-to-analog conversion unit is configured to convert the digital instruction to perform realizing selecting the grayscale voltage corresponding to the grayscale required by each pixel unit in the second display area from the grayscale voltage range.

10. A display method of the display device according to claim 1, comprising:

generating a first preset grayscale voltage;

calculating a grayscale required by each pixel unit in the second display area according to image data, and generating a grayscale voltage range comprising a plurality of grayscale voltages;

selecting a grayscale voltage corresponding to the grayscale required by each pixel unit in the second display area from the grayscale voltage range; and allocating the first preset grayscale voltage to all pixel units in the first display area.

11. The display method according to claim 10, wherein the first display area comprises a fingerprint recognition area and the second display area comprises a non-fingerprint recognition area, and the voltage value of the first preset grayscale voltage is smaller than the voltage value of anyone of the plurality of grayscale voltages in the grayscale voltage range.

12. The display method according to claim 10, wherein the grayscale voltage range comprises grayscale voltages from level 0 to level 255; the first preset grayscale voltage comprises a grayscale voltage in level 256.

13. The display method according to claim 12, wherein before the allocating the first preset grayscale voltage to all pixel units in the first display area, the display method further comprises:

receiving a recognition start signal;

wherein the recognition start signal is configured to indicate that the display device needs to start the fingerprint recognition area for fingerprint recognition.

14. The display method according to claim 13, wherein after the receiving the recognition start signal, the display method further comprises:

providing a storage information of the fingerprint recognition area to all pixel units in the fingerprint recognition area.

15. The display method according to claim 11, wherein the selecting a grayscale voltage corresponding to the grayscale required by each pixel unit in the second display area from the grayscale voltage range comprises:

calculating a digital instruction and send the digital instruction, and the digital instruction being configured to perform selecting the grayscale voltage corresponding to the grayscale required by each pixel unit in the second display area from the grayscale voltage range; and converting the digital instruction to perform selecting the grayscale voltage corresponding to the grayscale required by each pixel unit in the second display area from the grayscale voltage range.

16. A electronic device, comprising a processor and a memory, wherein the memory stores a program, and the processor executes the display method according to claim 10 when the program is executed by the processor.

* * * * *